(12) United States Patent
Matsuzaki et al.

(10) Patent No.: US 6,568,227 B2
(45) Date of Patent: May 27, 2003

(54) PARKING BRAKE DEVICE FOR VEHICLE

(75) Inventors: Akio Matsuzaki, Saitama (JP); Takahito Sekita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 09/758,371

(22) Filed: Jan. 12, 2001

(65) Prior Publication Data

US 2001/0020377 A1 Sep. 13, 2001

(30) Foreign Application Priority Data

Jan. 14, 2000 (JP) ........................................ 2000-006514
Jul. 10, 2000 (JP) ........................................ 2000-208893

(51) Int. Cl.⁷ .......................... B60R 25/08; E05B 65/12
(52) U.S. Cl. ................................ 70/247; 70/252; 70/254
(58) Field of Search ........................... 70/247, 264, 254, 70/252; 477/99; 192/220.6, 220.7; 188/69

(56) References Cited

U.S. PATENT DOCUMENTS 3,830,328 A * 8/1974 Schaefer et al. ............ 180/271
4,534,439 A * 8/1985 Shimazaki et al. ......... 180/215
4,615,192 A * 10/1986 Brown .......................... 70/181
5,657,654 A * 8/1997 Hoebel .................... 192/219.6
6,338,288 B1 * 1/2002 Spadaccini et al. ........... 70/247

FOREIGN PATENT DOCUMENTS

JP 9-286348 11/1997

OTHER PUBLICATIONS

Battery Application–Starter Motor, Sushant Balsekar, www.indiacar.com/infobank/battery1_od.htm.*

* cited by examiner

*Primary Examiner*—Anthony Knight
*Assistant Examiner*—John B. Walsh
(74) *Attorney, Agent, or Firm*—Birch, Stewart, Kolasch & Birch, LLP

(57) ABSTRACT

To provide a parking brake device allowing a vehicle to be kept in a wheel lock state by a parking brake when the vehicle is parked and a driver is separated from the vehicle and when an engine of a vehicle in a parking state is started. In a parking brake device in which a pull-up force of a parking lever supported by a base plate fixed on a vehicular body side is transmitted to a brake device of a vehicle via a wire to lock the brake device, an ignition block is provided on the parking lever. This parking brake device includes a lock pin projecting when a key cylinder is located in a LOCK position, and further the lock pin projects through a cutout only when the parking lever is in a brake lock state. With this configuration, the wheel is already in the lock state by the parking brake if an ignition key is inserted or removed in or from the key cylinder in the LOCK position.

18 Claims, 15 Drawing Sheets

PARKING BRAKE DEVICE FOR VEHICLE

BACKGROUND OF THE INVENTION

1. Field of the Invention

The present invention relates to a parking brake device allowing a vehicle to be maintained in a braking state during parking, and particularly to a parking brake device suitable for a small-sized vehicle having a simple structure allowing about one or two persons to ride thereon.

2. Description of Background Art

An automobile of a four-wheel or three-wheel type includes a parking brake device allowing a vehicle to be kept in a wheel braking state during parking or the like. In this parking brake device, a pull-up force of a parking lever provided in the vicinity of a driver's seat is transmitted to a brake device via a brake wire, to lock a corresponding wheel.

A vehicle including an automatic transmission may use a device for starting an engine in a parking brake operational state. In a vehicle of this type, the engine can be started in a state in which wheels are locked.

In recent years, from the viewpoint of reducing the amount of exhaust gas and also reducing the power consumption, a small-sized vehicle allowing about one or two persons to ride thereon has been developed and practically used.

Such a small-sized vehicle includes an engine having a small displacement or an electric motor (or a combination of an engine and an electric motor), which vehicle is used as means allowing a small number of persons to be easily moved with a reduced fuel consumption and a reduced amount of exhaust gas.

As a small-sized vehicle of this type, there is known a small-sized vehicle described, for example, in Japanese Patent Laid-open No. Hei 9-286348.

This small-sized vehicle has a body structure including a body frame formed by a pipe made from metal such as aluminum, which frame is covered with a resin made body cover divided into two parts in the vertical direction, wherein the upper body cover constitutes a roof, the lower body cover constitutes a driver's seat portion, and a body portion constitute a cabin for a single driver's seat. From the viewpoint of reducing the weight of the vehicular body and the cost, and of simplifying the power source. Such a small-sized vehicle is often of a type in which a door or a roof is omitted for allowing a driver to easily get on and off the vehicle.

The above-described conventional device allows for the start-up of an engine in a wheel lock state and is characterized by detecting the fact that a select lever of a transmission is located at a parking position and a parking brake lever is pulled up by using an electric sensor, and controls the start-up of the engine by an ignition device. Such a device, however, has a disadvantage because it has a complicated and expensive structure. Accordingly, for a vehicle, particularly, a small-sized vehicle required to be reduced in weight and cost, it is expected to provide a parking brake device with a simple structure at a low cost.

For a vehicle, it is also expected to provide a parking brake device allowing a vehicle to be kept in a parking brake operational state when the vehicle is parked and the driver is separated from the vehicle.

For a vehicle with no roof or a small-sized vehicle with no door, since a parking brake lever provided in a driver's seat is exposed, it is expected to provide a parking brake device not allowing the parking brake to be easily released in a state in which a driver is separated from a vehicle.

SUMMARY AND OBJECTS OF THE INVENTION

In view of the foregoing, the present invention has been made, and an object of the present invention is to provide a parking brake device having a simple structure allowing a vehicle to be maintained in a parking brake operational state when the vehicle is parked and the driver is separated from the vehicle.

Another object of the present invention is to provide a parking brake device having a simple structure allowing a vehicle to be maintained in a parking brake operational state when a power supply such as an internal combustion engine or an electric motor is started. Other objects will be more clearly understood in the following description.

To achieve the above objects, according to the present invention, there is provided a parking brake device for a vehicle, including a base member fixed on a vehicular body side of a portion, in the vicinity of a drive's seat, of the vehicle; a parking lever movably supported by the base member; and a brake wire for transmitting a pull-up force of the parking lever thereby locking a brake device of a wheel. The parking lever is provided with an ignition device having a first position where a key is removably insertable in a key cylinder and a second position where a power supply of the vehicle becomes an operational state. The positions are set as shift positions of the key cylinder. The ignition device is provided with a lock piece, which projects when the key cylinder is located in the first position and retracts when the key cylinder is turned into the second position. The parking lever is provided with an engagement portion to be engaged with the lock piece in the projecting state, thereby fixing the parking lever; whereby the key is removably insertable in the key cylinder only in a state in which the parking brake device is operated.

With this configuration, the parking lever must be pulled up before the key cylinder is located at the first position. Accordingly, if the ignition key is removed from the key cylinder when the vehicle is parked and the driver is separated from the vehicle, the wheels are already in the lock state because of the parking brake. Also the key cylinder must be located in the first position before the ignition key is inserted in the key cylinder for starting a power supply such as an internal combustion engine of a vehicle in the parking state. Accordingly, if a power supply such as an internal combustion engine of a vehicle in the parking state is started, the parking lever is already in the pulled-up state and thereby the wheels are already in the lock state because of the parking brake.

In the parking brake device for a vehicle according to the present invention, preferably, the parking lever is provided with a cutout in which the lock piece in the projecting state is to be inserted; and a link mechanism having a stop plate for opening/closing the cutout according to the movement of the parking lever is interposed between the parking lever and the base member, the stop plate being operated to open the cutout for allowing the projection of the lock piece in a state in which the parking lever is pulled up and to block the cutout for blocking the projection of the lock piece in a state in which the parking lever is depressed.

With this configuration, it is possible to realize a parking brake mechanism operated in co-operation with the ignition device by using a simple structure capable of controlling the operation of the parking lever due to insertion/removal of the lock piece in/from the cutout and the presence and absence of engagement of the lock piece in the cutout by means of the stop plate of the link mechanism operated according to the movement of the parking lever.

In the parking brake device for a vehicle according to the present invention, preferably, the parking lever is provided with a cutout in which the lock piece in the projecting state is to be inserted; and a link mechanism having a stop plate for opening/closing the cutout according to the movement of the parking lever is interposed between the parking lever and the base member, the stop plate being operated to open the cutout for allowing the projection of the lock piece in a state in which the parking lever is pulled up and to block the cutout for blocking the projection of the lock piece in a state in which the parking lever is depressed.

With this configuration, it is possible to realize a parking brake mechanism operated in co-operation with the ignition device by using a simple structure capable of controlling the operation of the parking lever due to insertion/removal of the lock piece in/from the cutout and the presence and absence of engagement of the lock piece in the cutout by means of the stop plate of the link mechanism operated according to the movement of the parking lever.

In the parking brake device for a vehicle according to the present invention, preferably, a ratchet is provided on a vehicular body side and a pole lever having a claw to be engaged with the ratchet is turnably provided on the parking lever; the pole lever is provided with a stop plate portion, the stop plate portion being operated to open the cutout for allowing the projection of the lock piece in a state in which the parking lever is pulled up and to block the cutout for blocking the projection of the lock piece in a state in which the parking lever is depressed.

With this configuration, it is possible to realize a parking brake mechanism operated in co-operation with the ignition device by using a simple structure capable of controlling the operation of the parking lever due to insertion/removal of the lock piece in/from the cutout and the presence and absence of engagement of the lock piece in the cutout by means of the stop plate portion of the pole lever operated according to the movement of the parking lever.

The present invention is applicable to a vehicle including an internal combustion engine as a power supply, and to a vehicle including an electric motor as a power supply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
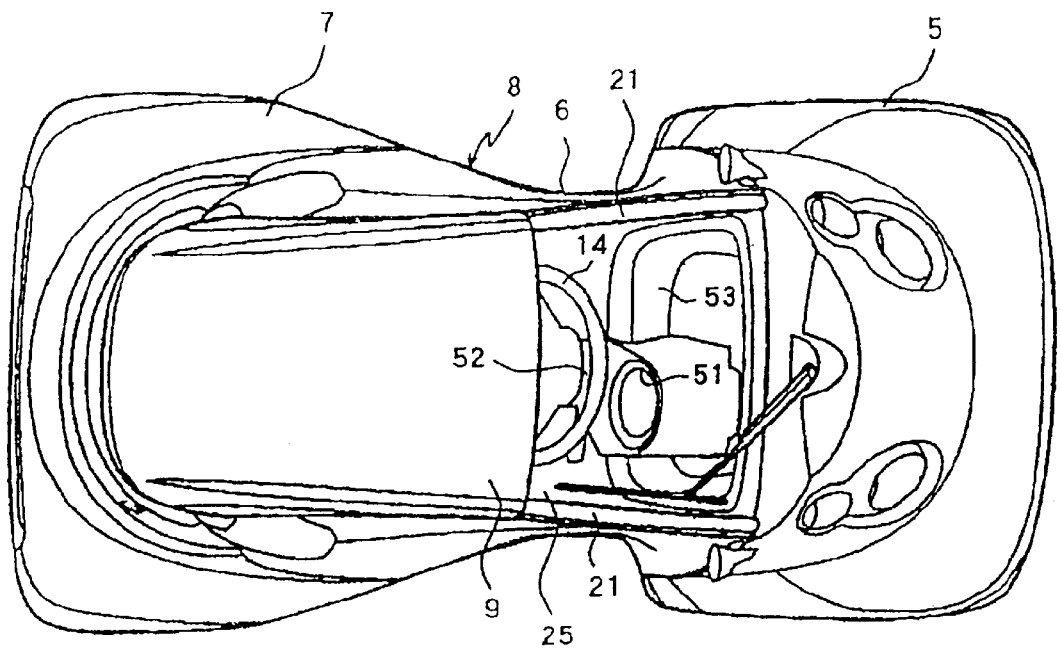
FIG. 1 is a plan view of a small-sized vehicle according to a first embodiment of the present invention.

Hereinafter, embodiments of the present invention will be described in detail with reference to the drawings. As shown in FIGS. 1 to 6, a small-sized vehicle according to one embodiment is configured as a four-wheeled vehicle including two front wheels 1 and two rear wheels 2, wherein a single seat 3 on which only a driver is to sit is provided at a central portion of the vehicle.

The small-sized vehicle has a basic body structure in which a body frame 4 formed by a pipe made from a metal such as aluminum is covered with a resin made body cover. The resin made body cover is divided into three parts, that is, a front body cover 5 constituting a front portion, a center body cover 6 constituting a central portion, and a rear body cover 7 constituting a rear portion. A resin made roof panel 9 is provided over the center body cover 7 to cover the upper side of the driver's seat 3, thereby forming a cabin at the central portion of the vehicle.

An inner panel 50 is provided in front of the driver's seat, the panel 50 has a width nearly equal to the vehicle width.

The inner panel 50 includes a starter switch 55 and a cylindrical meter cover 51 for containing meters such as a speed meter, a column cover 52 through which a steering column passes, and a pocket 53 located around the meter cover 51. The covers 51 and 52 and the pocket 53 are formed integrally with the inner panel 50 by resin molding.

Figure 3:
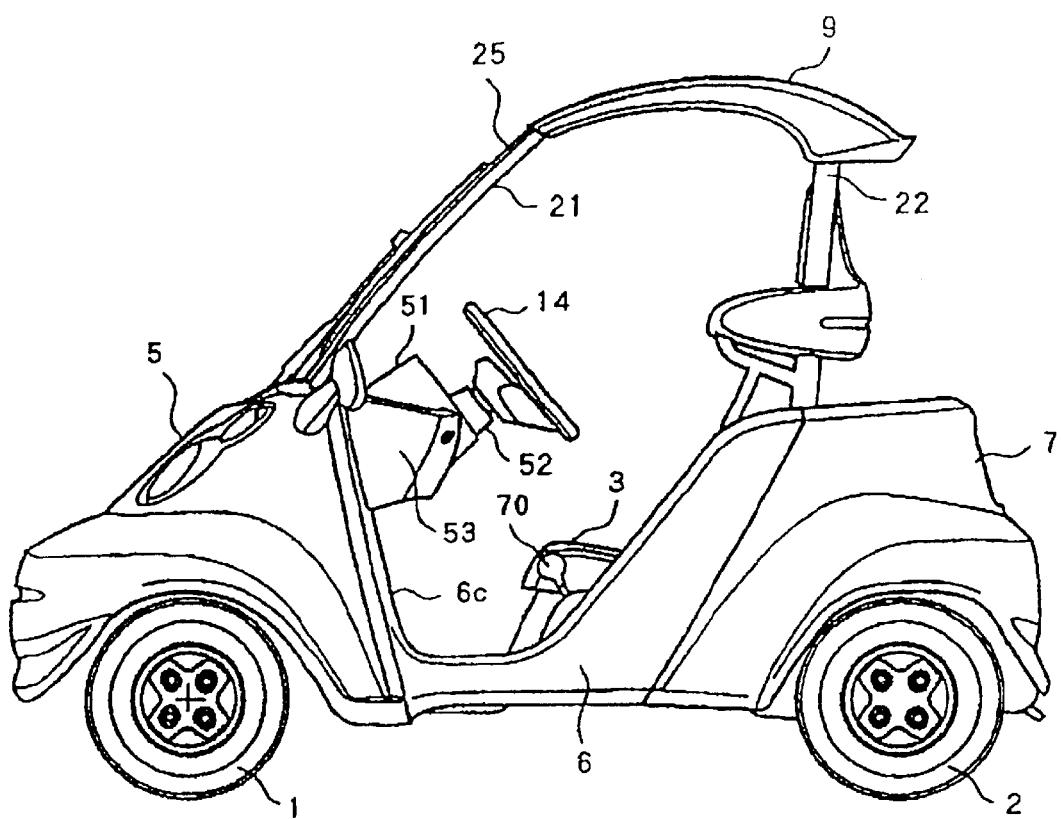
FIG. 3 is a left side view of the small-sized vehicle according to the first embodiment of the present invention.

As illustrated in FIG. 3, a select lever 70 is provided on the left side of the seat 3. The select lever 70 is operated to select an operational mode of an automatic transmission of a power unit 17.

Figure 4:
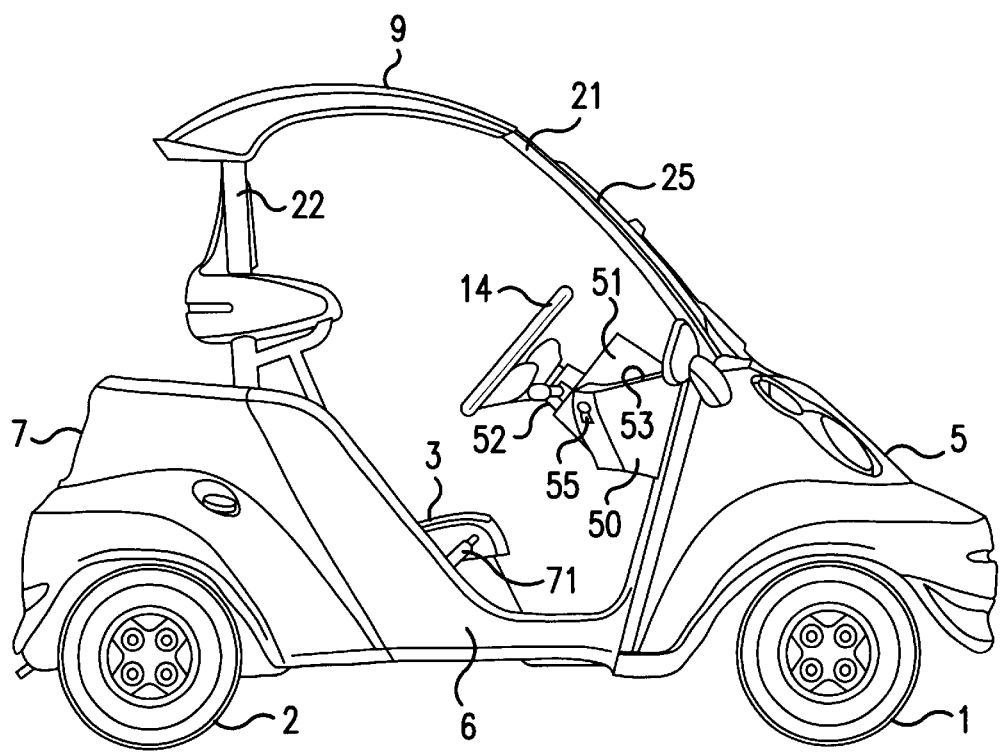
FIG. 4 is a right side view of the small-sized vehicle according to the first embodiment of the present invention.
Figure 5:
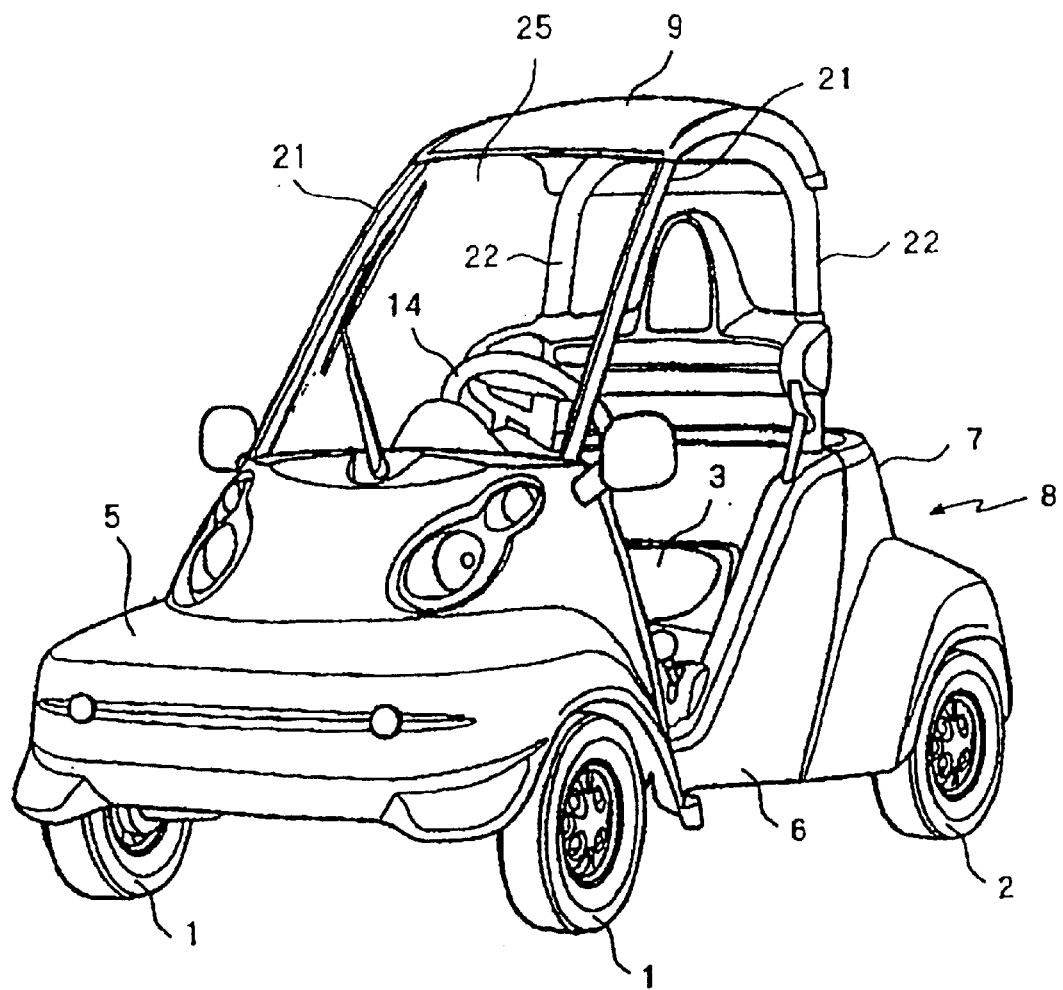
FIG. 5 is a perspective view, seen from the front side, of the small-sized vehicle according to the first embodiment of the present invention.
Figure 6:
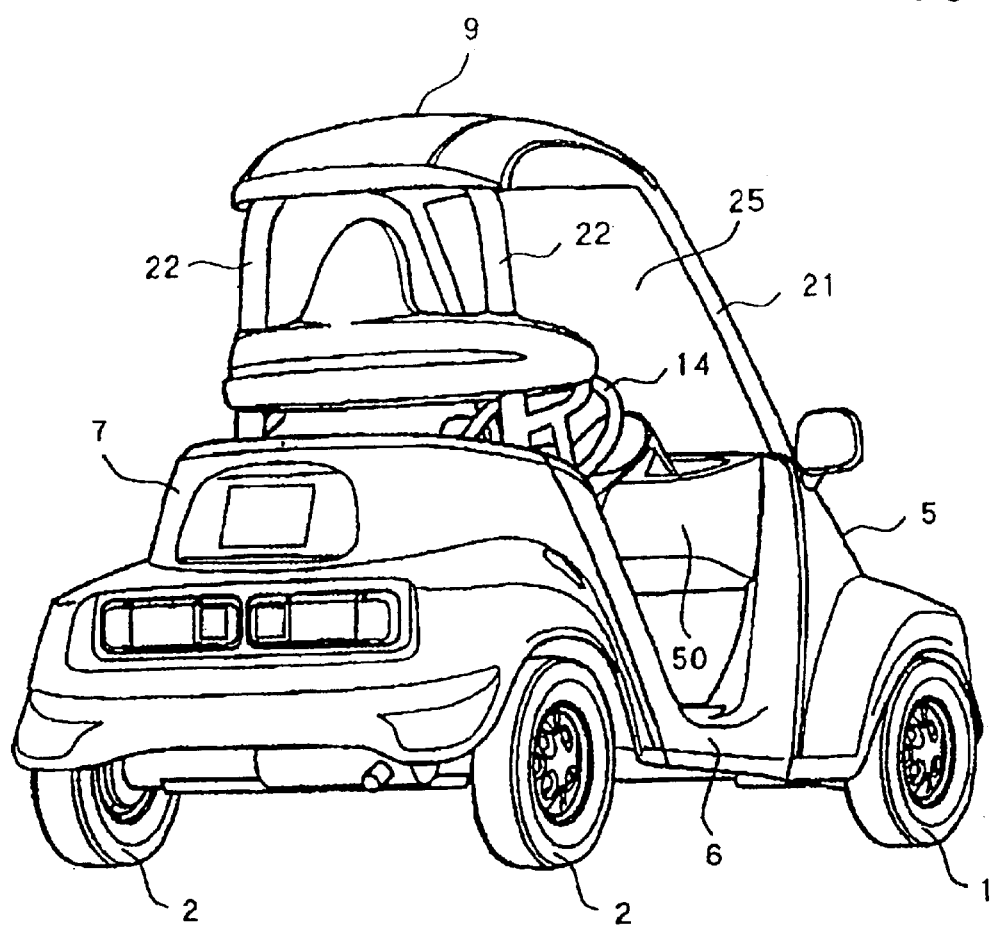
FIG. 6 is a perspective view, seen from the back side, of the small-sized vehicle according to the first embodiment of the present invention.

As illustrated in FIG. 4, a parking brake lever 71 is provided on the right side of the seat 3. As will be described later, brake devices of the rear wheels can be kept in the locked state by pulling up the parking lever 71.

Figure 2:
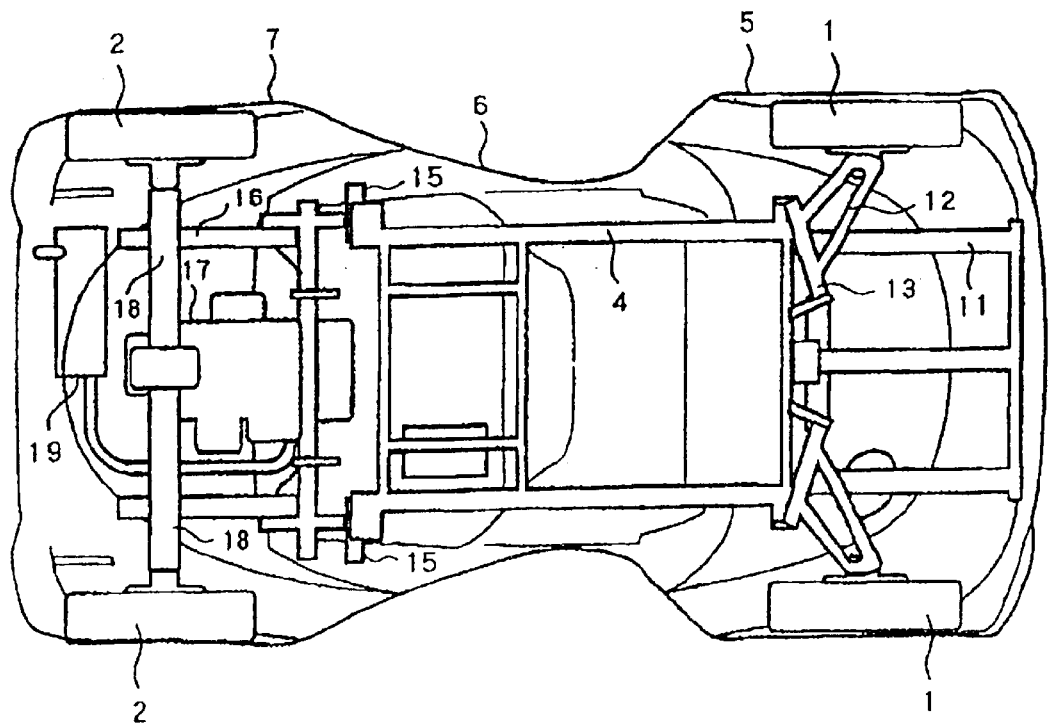
FIG. 2 is a bottom view of the small-sized vehicle according to the first embodiment of the present invention.

Referring to FIG. 2, three front beams 11 made from a metal such as aluminum are provided on the inner side of the front body cover 5 in such a manner as to protrude from the body frame 4. The front beams 11 function to support and absorb a load applied from the front side of the vehicle.

A pair of front arms 12 are mounted to the front portion of the body frame 4. Each front arm 12 is swingable around a pivot 13 and rotatably supports, at a leading end, the front wheel 1. When a steering force is applied from a steering wheel 14 to the front arms 12 via a steering mechanism (not shown), the front wheels 1 are turned to change the operating direction of the vehicle.

A swing frame 16 is mounted to the rear portion of the body frame 4 in such a manner as to be swingable around a pair of pivots 15. A power unit 17, which integrally includes an internal combustion engine, an automatic transmission, a differential mechanism, and the like, is provided on the swing frame 16. A pair of axle shafts 18 protrude from the differential mechanism of the power unit 17, and the rear wheels 2 are mounted to the leading ends of the axle shafts 18, whereby the rear wheels 2 are driven by power supplied from the power unit 17.

In FIG. 2, an exhaust system 19 includes an exhaust pipe and a muffler, extending from the engine of the power unit 17. In addition, a suspension mechanism (not shown) is provided between the swing frame 16 and the body frame 4. The body structure of the above-described small-sized vehicle will be described in more detail.

The roof panel 9 are supported by a pair of front pillars 21 and a pair of rear pillars 22. The front pillars 21 are erected from the body frame 4 with their lower ends supported by the body frame 4. To be more specific, the front pillars 21 extend upwardly, while slightly tilting rearwardly, from a joint portion between the front body cover 5 and the center body cover 6. The rear pillars 22 are erected from the body frame 4 with their lower ends supported by the body frame 4. To be more specific, the rear pillars 22 extend upwardly nearly in the vertical direction from a joint portion between the center body cover 6 and the rear body cover 7.

Each of the front pillars 21 and the rear pillars 22 is formed by a long-sized skeleton pipe made from a metal such as aluminum, the surface of which is covered with a resin or rubber layer formed by molding. The long-sized skeleton pipes constituting the front and rear pillars 21 and 22 have a rigidity and a strength being large enough to support the roof panel 9. In this embodiment, the upper ends of the rear pillars 22 erected on the right and left sides of the seat 3 are connected to each other into a U-shaped, to form a roll bar that surrounds the side and upper portions of a driver positioned on the seat 3.

The front pillars 21 erected on both sides of a front portion of the cabin support the roof panel 9 and also hold both side portions of a front window panel 25 made from a transparent resin or glass material therebetween.

Figure 7:
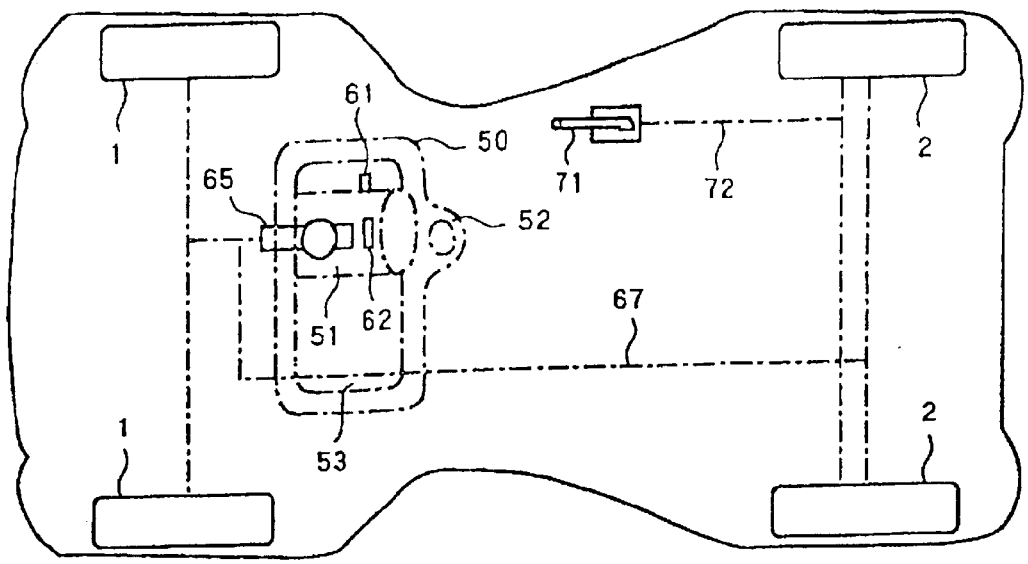
FIG. 7 is a plan view showing a brake system according to the first embodiment of the present invention.

Referring to FIG. 7, a brake pedal 62 as well as an accelerator pedal 61 are provided in front of and under the seat 3. A depressed force of the brake pedal 62 is transmitted to a brake master cylinder 65, to actuate the braking liquid, thereby operating hydraulic brake devices provided on the front and rear wheels 1 and 2. So as to brake the front and rear wheels 1 and 2. In FIG. 7, a brake liquid path 67 extends from the brake master cylinder 65 to the brake devices of the front and rear wheels 1 and 2.

Figure 8:
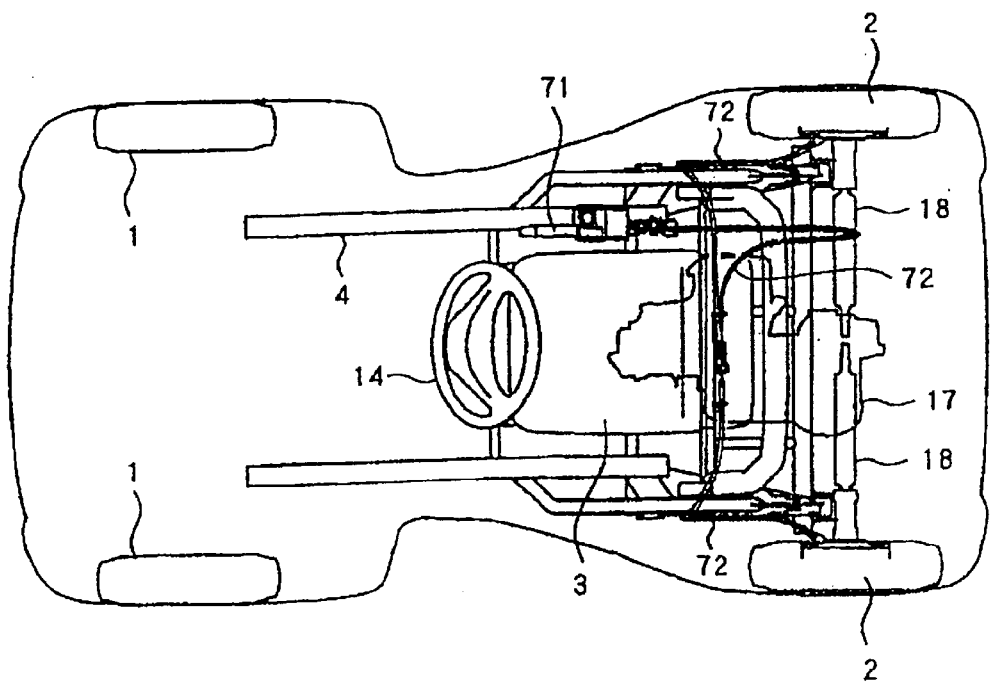
FIG. 8 is a front view showing a layout of a parking brake wire according to the first embodiment of the present invention.
Figure 9:
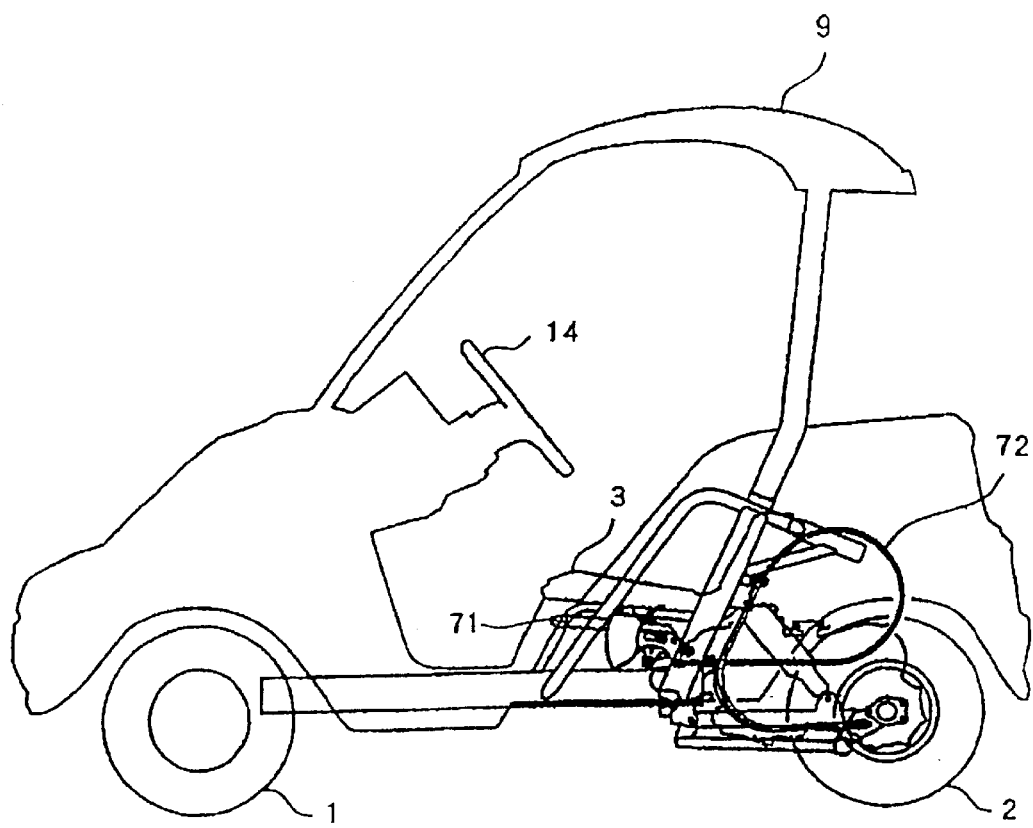
FIG. 9 is a side view showing a layout of a parking brake wire according to the first embodiment of the present invention.

Referring particularly to FIGS. 8 and 9, a parking brake lever 71 provided on the right side of the seat 3 is connected to parking brake mechanisms of the brake devices of the rear wheels 2 via wires 72. A mechanical parking brake operation is performed by pulling up the parking lever 71.

Figure 10:
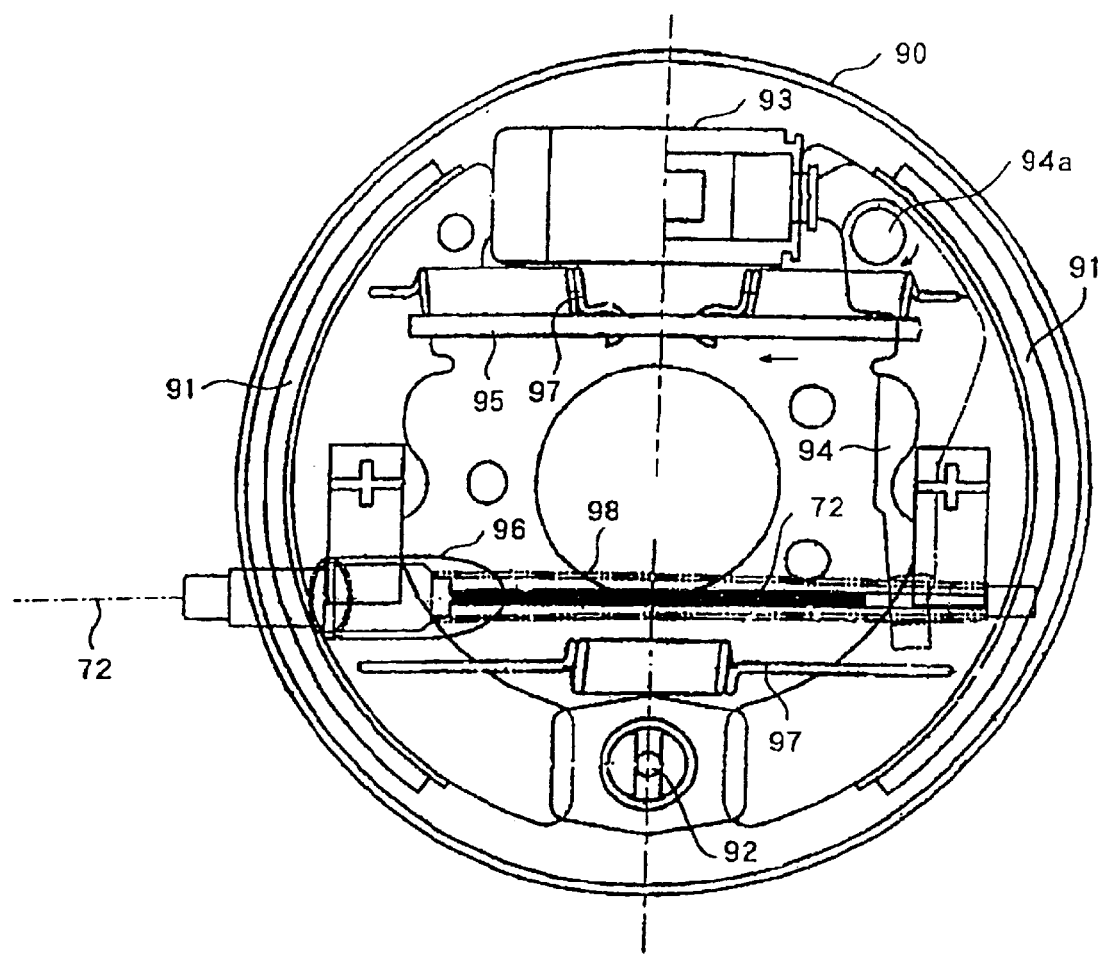
FIG. 10 is a front view showing a drum brake device with a parking mechanism according to the first embodiment of the present invention.

To be more specific, each of the brake devices provided on the rear wheels 2 is configured as a hydraulic brake device including a mechanical parking brake mechanism having a structure shown in FIG. 10, in which the brake device is operated by a hydraulic pressure generated by depressing the brake pedal 62 or a wire pulling force generated by pulling up the parking lever 71.

The brake device includes a cylindrical drum 90 mounted to the rear wheel 2, and a back plate (not shown) fixed on the vehicular body side. One-end of a pair of semi-circular brake shoes 91 are swingably supported by the back plate via an anchor pin 92, and a brake cylinder 93 is provided between the other ends of the brake shoes 91. When hydraulic pressure is supplied from the master cylinder 65 into the brake cylinder 93 via the brake liquid path 73, the brake cylinder 93 extends to spread out the pair of brake shoes 91. As a result, the brake shoes 91 are brought into press-contact with the inner peripheral surface of the drum 90, to thereby brake the rear wheel 2 rotating together with the drum 90.

The brake device also has the above-described mechanical parking brake mechanism including a lever 94 rotatably supported by one brake shoe 91 via a pin 94a and a rod 95 interposed between an intermediate portion of the lever 94 and the other brake shoe 91, wherein the parking brake wire 72 pulled in the drum 91 through a plug 96 provided on the back plate is connected to the leading end of the lever 94. Accordingly, when the brake wire 72 is pulled, the lever 94 is turned around the pin 94a as shown by an arrow in FIG. 10, whereby the rod 95 is moved on the other brake shoe 91 side as shown by another arrow in FIG. 10 to spread out the pair of brake shoes 91. As a result, the pair of brake shoes 91 are brought into press-contact with the inner peripheral surface of the drum 90, to thereby block the rotation of the rear wheel 2 mounted on the drum 90.

In FIG. 10, a return spring 97 acts against the brake cylinder 93, and a return spring 98 acts against the wire 72.

Figure 11:
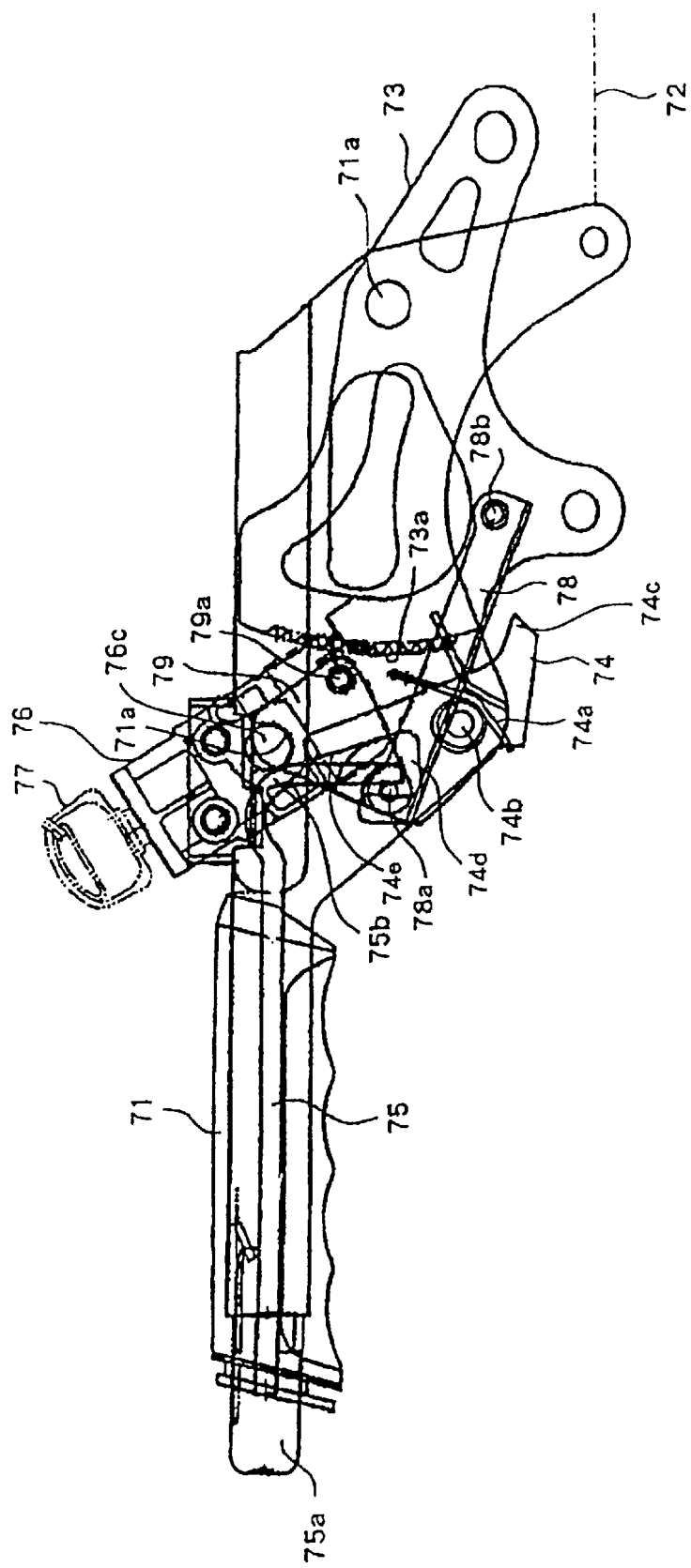
FIG. 11 is a front view showing a state in which a parking lever is depressed according to the first embodiment of the present invention.
Figure 12:
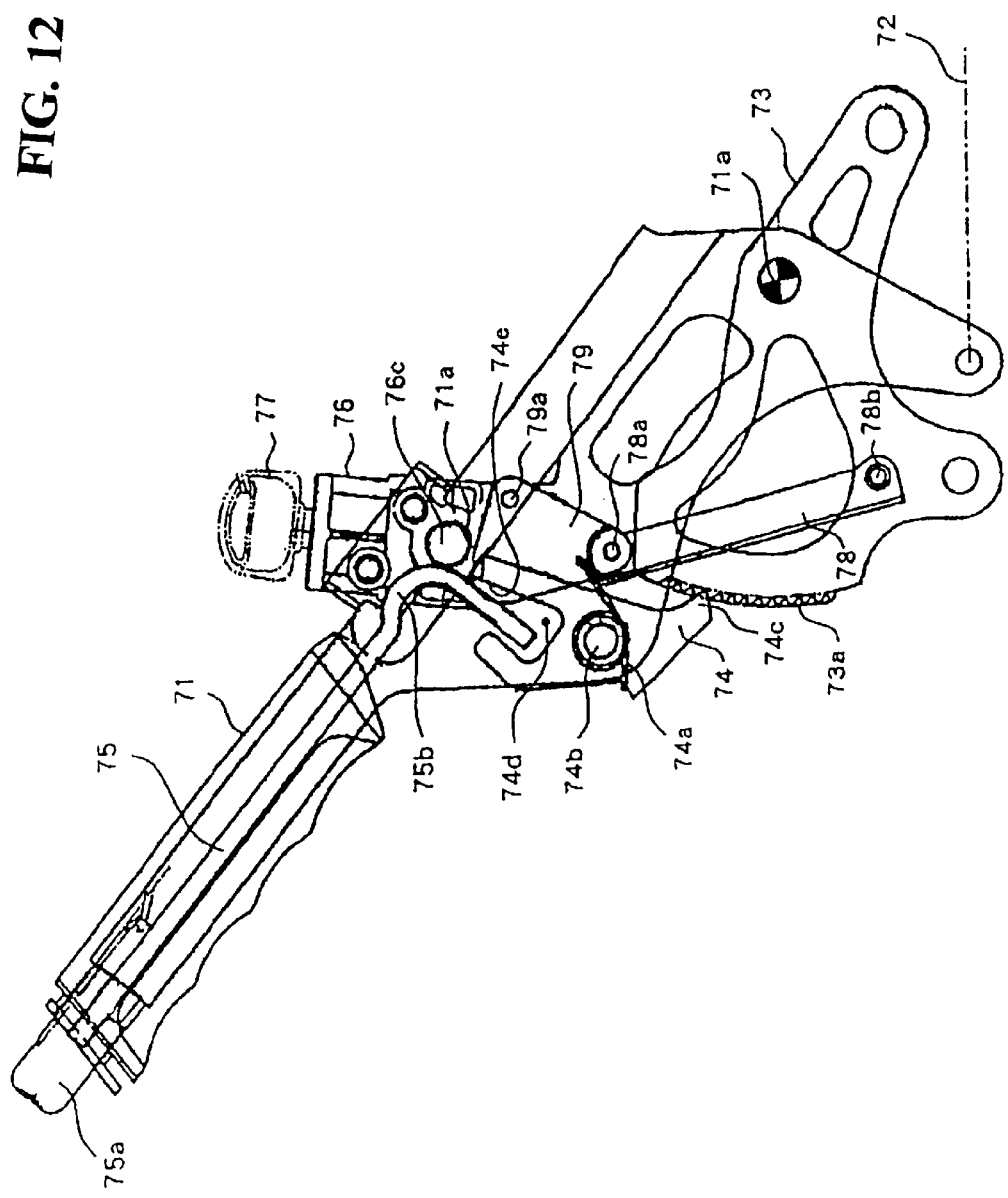
FIG. 12 is a front view showing a state in which the parking lever is pulled up according to the first embodiment of the present invention.

The parking lever 71 for performing the parking brake operation by pulling the wire 72 is additionally provided with a mechanism, shown in FIGS. 11 to 14, for connection of the parking operation with an ignition operation. FIG. 11 shows a state in which the parking lever 71 is depressed, that is, the non-braking state, and FIG. 12 shows a state in which the parking lever 71 is pulled up, that is, the braking state. The parking lever 71 is swingably mounted, via a pin 71a, to a base plate 73 fixed on the vehicular body side. A pole lever 74, is biased counterclockwise in FIG. 11 by a spring 74a, and is swingably mounted to the parking lever 71 via a pin 74b. When the parking lever 71 is pulled up, a claw 74c of the pole lever 74 is engaged with a ratchet 73a provided on the base plate 73, whereby the parking lever 71 is held at the pulled-up position.

A rod 75 for connecting an operational button 75a to the pole lever 74 is provided at the leading end of the parking lever 71. When the operational button 75a is depressed by the driver, the pole lever 74 is turned clockwise in FIG. 11 against the biasing force of the spring 74a by the rod 75, to remove the claw of the pole lever 74 from the ratchet 73a, whereby the parking lever 71 can be depressed.

The parking lever 71 can be pulled up without depressing the operational button 75a because the claw 74c of the pole lever 74 slides on the ratchet 73a. On the contrary, in the case of depressing the parking lever 71, since the claw 74c of the pole lever 74 engages the ratchet 73a, the parking lever 71 cannot be depressed unless the operational button 75a is depressed to release the engagement of the claw 74c with the ratchet 73a.

The rod 75 is connected to the pole lever 74 by engagement therebetween. To be more specific, a leading end 75b (opposite to the operational button 75a) of the rod 75 is bent into a hook-shape, while a recess 74d is formed in a portion, opposite to the claw 74c, of the pole lever 74; and the hook-shaped leading end 75b is engaged in the recess 74d. Accordingly, when the rod 75 is depressed, a portion (engagement portion) 74e, on the ratchet 73a side, of the recess 74d of the pole lever 74 is pushed down by the leading end 75b of the rod 75. As a result, the pole lever 74 is turned around the pin 74b in the direction where the claw 74c is removed from the ratchet 73a.

An ignition block 76 is mounted to the parking lever 71, and a key cylinder 76b having a key hole 76a is provided on the ignition block 76. An ignition key 77 can be removably inserted in the key hole 76a. The ignition key 77 inserted in the key cylinder 76b is turned to shift the position of the key cylinder 76b, thereby turning on/off a power supply system of the vehicle depending on the shift position of the key cylinder 76b.

The shift positions of the key cylinder 76b includes a LOCK position where the key 77 can be removably inserted in the key cylinder 76b, an ON position where the supply of power to an electric system of the vehicle is turned into the ON-state, and thereby into an engine operational condition, and an OFF position, located between the LOCK position and the ON position, for cutting off the power supply. The LOCK position is taken as the first position, and the ON position or OFF position is taken as the second position.

In this embodiment including the internal combustion engine as a power supply, a starter switch 55 of a button type, for example, which is separated from the ignition block 76, is typically provided on the inner panel 50. When the starter switch 55 is operated in the state in which the key cylinder 76b is located in the ON position, a starter motor is operated to start the engine.

A lock pin 76c moves forwardly or rearwardly according to the position of the key cylinder 76b. The lock pin 76c is provided on the ignition block 76. The lock pin 76c projects only in the state in which the key cylinder 76b is located at the LOCK position, and is left retracted in the state in which the key cylinder 76b is located at any position other than the LOCK position. To be more specific, in the case where the key cylinder 76b is located at the LOCK position and the ignition key 77 is removably inserted in or from the key cylinder 76b, the lock pin 76c projects from a side portion of the ignition block 76 onto the parking lever 71 side.

Figure 13:
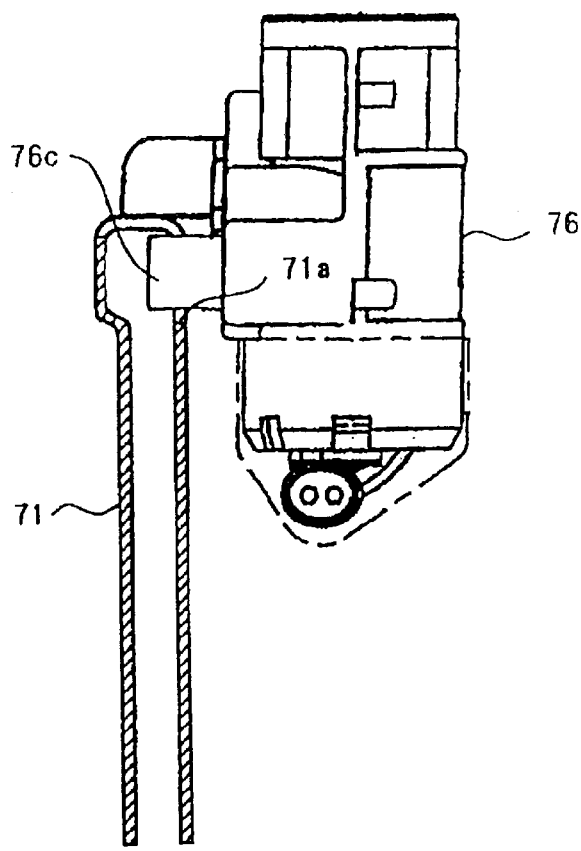
FIG. 13 is a side view showing the parking lever and an ignition block according to an embodiment of the present invention.
Figure 14:
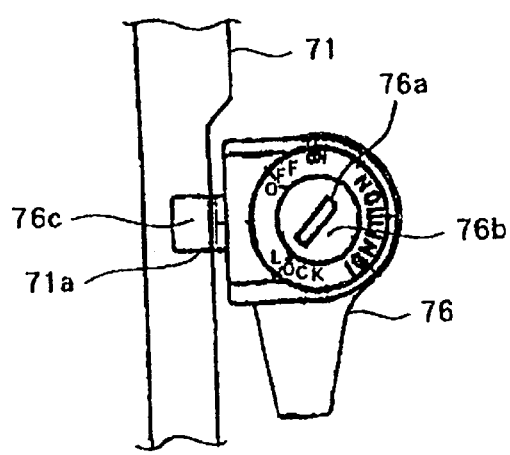
FIG. 14 is a front view showing the parking lever and an ignition block according to an embodiment of the present invention.

Referring particularly to FIGS. 13 and 14, a cutout 71a corresponding to the lock pin 76c is provided in an upper side portion of the parking lever 71, the lock pin 76c is inserted in the cutout 71a, to thus project without contact with the parking lever 71.

As will be described later, the projection of the lock pin 76c is allowed only when the key cylinder 76b is located at the LOCK position and also the parking lever 71 is pulled up.

A link mechanism is interposed between the parking lever 71 and the base plate 73. The link mechanism connects a link 78 to a triangular stop plate 79 by means of a pin 78a. The cutout 71a is opened/closed by the stop plate 79 according to the movement of the parking lever 71. To be more specific, one end of the link 78 is pivotably mounted to the base plate 73 by means of a pin 78b, the other end of the link 78 is pivotably mounted to one end of the stop plate 79 by means of the pin 78a, and the other end of the stop plate 79 is pivotably mounted to the parking lever 71 by means of a pin 79a. With this link mechanism, in the state in which the parking lever 71 is depressed as shown in FIG. 11, the link mechanism is bent so that part of the stop plate 79 is overlapped to the cutout 71a to thereby block the cutout 71a, and in the state in which the parking lever 71 is pulled up as shown in FIG. 12, the link mechanism extends so that the stop plate 79 is shifted to open the cutout 71a.

Accordingly, in the state in which the parking lever 71 is depressed, the lock pin 76c cannot project because of contact with the stop plate 79, and in the state in which the parking lever 71 is pulled up, the lock pin 76c can project in a space formed by the cutout 71a. That is to say, unless the parking lever 71 is located at the parking position, the key cylinder 76b cannot be turned into the LOCK position, and consequently the ignition key 77 cannot be removed from the key cylinder 76b.

Further, in the state in which the parking lever 71 is pulled up and the lock pin 76c projects in the cutout 71a, the leading end (engagement portion) 75b of the rod 75 located at the return position is in contact with the lock pin 76c. Accordingly, in such a state, if the operational button 75a is intended to be depressed for releasing the engagement between the pole lever 74 and the ratchet 73a, the operational button 75a cannot be depressed because the movement of the rod 75 is blocked by the lock pin 76c. As a result, in the state in which the lock pin 76c projects in the cutout 71a (that is, in the state in which the parking lever 71 is pulled up and the key cylinder 76b is located in the LOCK position), the operation to depress the parking lever 71 for releasing the parking brake is blocked.

In addition, the operation to pull up the parking lever 71 can be performed without depressing the operational button 75a, and accordingly, from the state in which the parking lever 71 is pulled up, the parking lever 71 can be further pulled up within a specific operational allowance.

The above-described operations will be described more clearly with reference to a sequence of operations shown in FIGS. 15(a) to 15(e). It should be noted that for an easy understanding, the ignition key 77 is not shown and one end of the key hole 76a is depicted as being sharpened to clearly show the shift position of the key cylinder 76b.

Figure 15A:
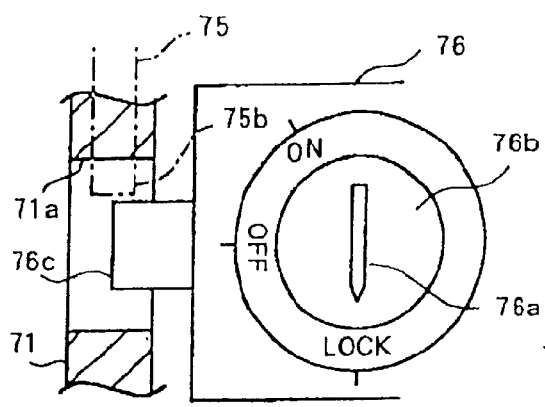
FIGS. 15(a) to 15(e) are views illustrating the operations of the first embodiment of the present invention.

In a state in which the engine is stopped and the vehicle is parked while operating the parking brake, as shown in FIG. 15(a), the key cylinder 76b is located at the LOCK position and the ignition key is left removed from the key cylinder 76b. Further, in this state, the cutout 71a of the parking lever 71 is released from the stop plate 79, and the lock pin 76c projecting from the ignition block 76 is inserted in the cutout 71a.

Accordingly, even if the operational button 75a is intended to be depressed for depressing the parking lever 71, since the leading end 75b of the rod 75 is in contact with the lock pin 76c and thereby the engagement between the ratchet 73a and the pole lever 74 is not released, it is possible to block the operation to depress the parking lever 71 and hence to prevent the parking brake from being accidentally released during parking.

Figure 15D:
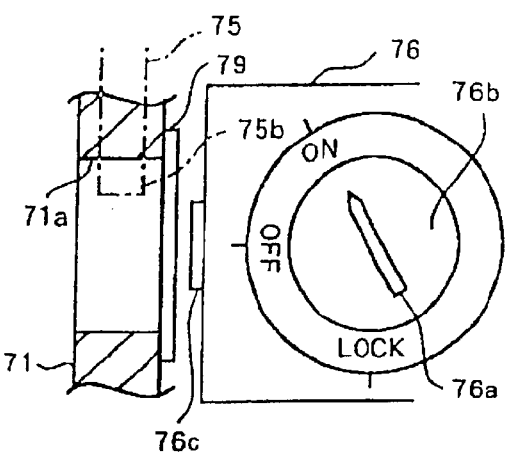
Figure 15B:
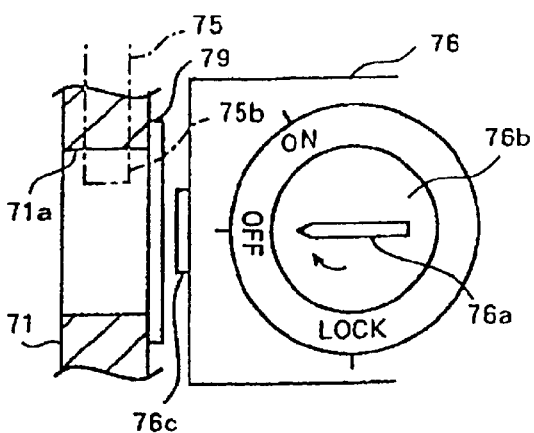

As shown in FIG. 15(b), when the ignition key 77 is inserted in the key hole 76a by the driver and the key cylinder 76b is turned into the OFF position, the lock pin 76c retracts from the cutout 71a, so that the parking lever 71 can be depressed for releasing the parking brake.

Figure 15E:
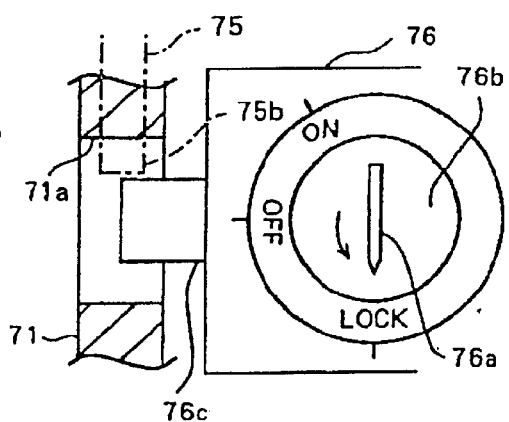
Figure 15C:
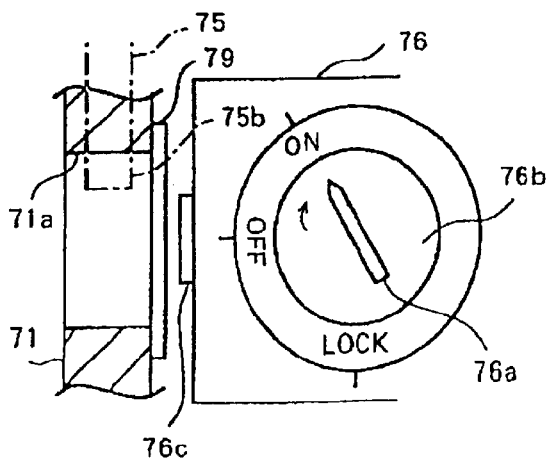

Subsequently, as shown in FIG. 15(c), when the key cylinder 76b is turned into the ON position to operate the starter switch, the engine of the power unit 17 is started by the starter motor.

As shown in FIG. 15(d), in such an operational state, the parking lever 71 is depressed and the cutout 71a is blocked with the stop plate 79, and accordingly, when the engine is intended to be stopped to park the vehicle, as shown in FIG. 15(e), unless the parking lever 71 is pulled up to release the cutout 71a, the key cylinder 76b cannot be located in the LOCK position for removing the ignition key from the key cylinder 76b. As a result, when the engine is stopped to park the vehicle, the parking brake can be turned into the operational state.

Figure 16:
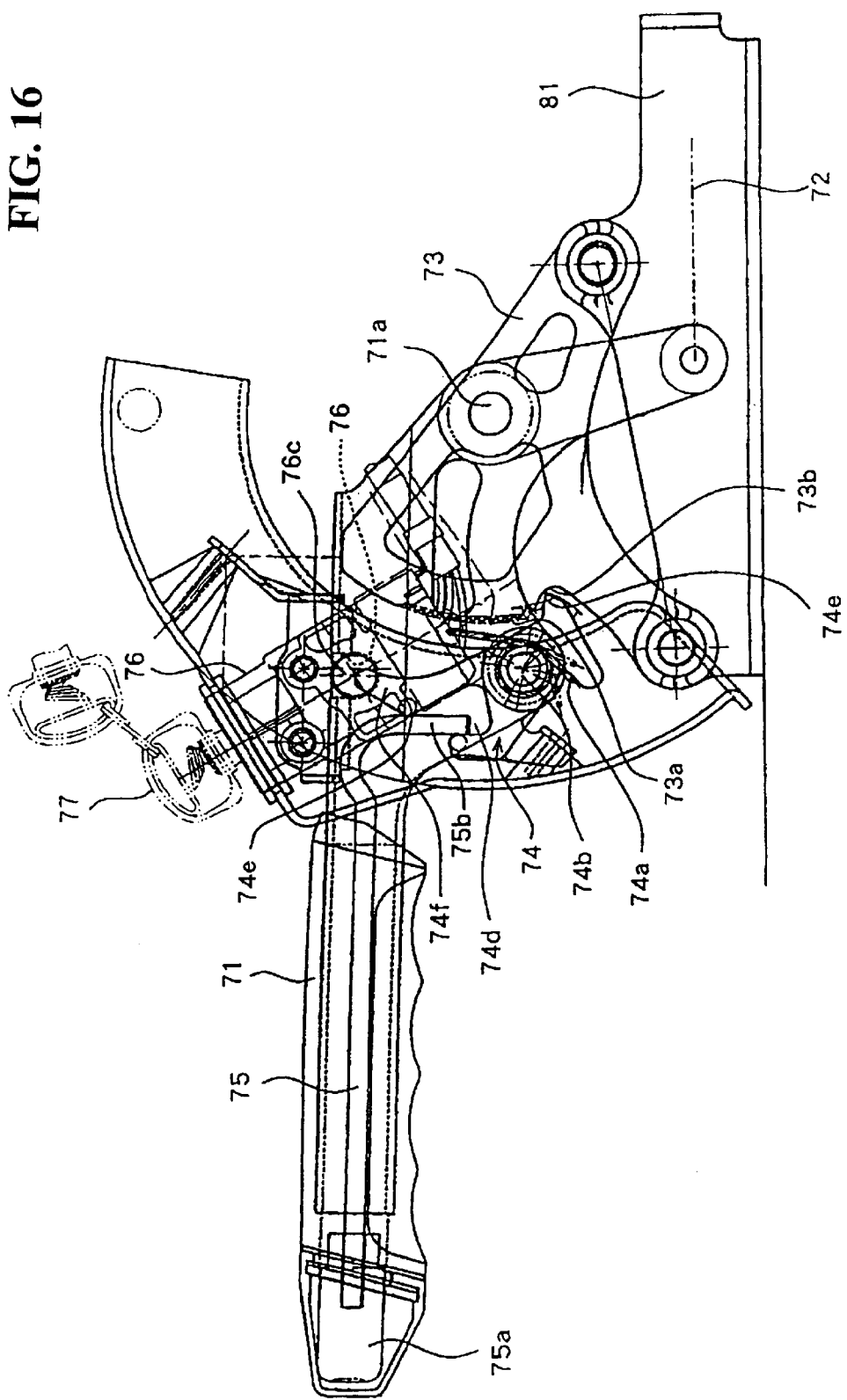
FIG. 16 is a front view showing a state in which a parking lever is depressed according a second embodiment of the present invention.
Figure 17:
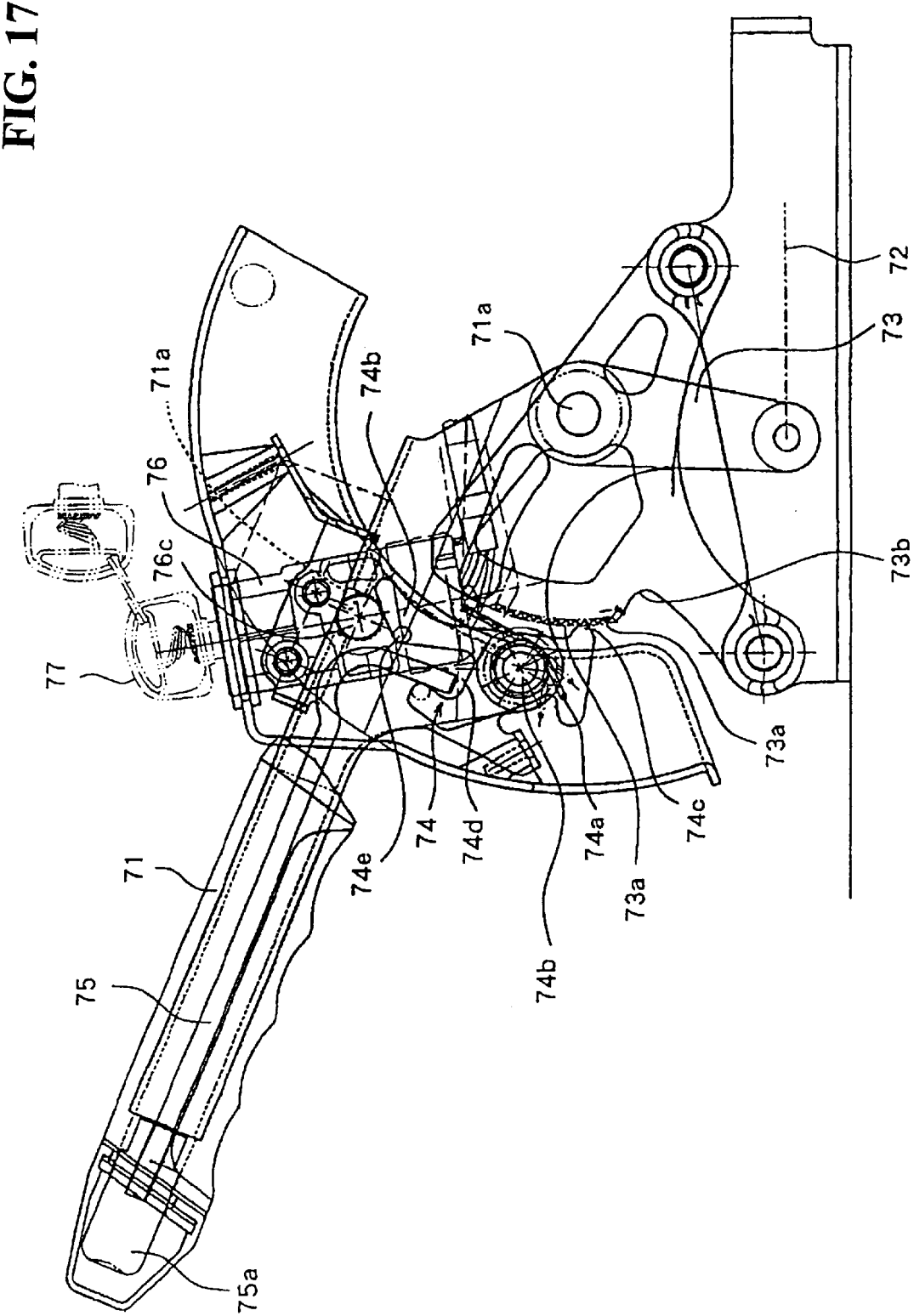
FIG. 17 is a front view showing a state in which the parking lever is pulled up according to the second embodiment of the present invention.

Another embodiment will be described with reference to FIGS. 16 and 17. FIG. 16 shows a state in which the parking lever 71 is depressed, that is, the non-braking state, and FIG. 17 shows a state in which the parking lever 71 is pulled up, that is, the braking state. In FIGS. 16 and 17, parts corresponding to those in the embodiment shown in FIGS. 11 to 14 and FIGS. 15(a) to 15(e) are designated by the same reference numerals, and the detailed description thereof is omitted.

A parking lever 71 is swingably mounted, via a pin 71a, to a base plate 73 as a base member fixed to a bracket 81 on the vehicular body side. Like the previous embodiment, a pole lever 74, which is biased counterclockwise in FIGS. 16 and 17 by a spring 74a, is swingably mounted to the base plate 73 via a pin 74b. A claw 74c, which is to be engaged with a ratchet 73a, is formed on one end side of the pole lever 74.

A recess 74d is formed in a portion, opposite to the claw 74c with respect to the pin 74b functioning as a swing center, of the pole lever 74. One of walls surrounding the recess 74d, located on the ratchet 73a side, of the pole lever 74 serves as a stop plate portion 74f, which extends upwardly in an approximately dogleg shape as seen in FIGS. 16 and 17. As shown in FIG. 16, when the parking lever 71 is in the depressed state, that is, when the claw 74c of the pole lever 74 is removed from the ratchet 73a and is located in the recess 73b under the ratchet 73a, part of the stop plate portion 74f is overlapped to a cutout 71a, which cutout is provided in an upper side portion of the parking lever 71 in such a manner as to correspond to a lock pin 76c, to block the cutout 71a. Since the cutout 71a is blocked with the stop plate portion 74f, if a key cylinder 76b located at an ON position (see FIG. 18(c)) or an OFF position (see FIG. 18(b)) is intended to be turned into a LOCK position, it cannot be turned because the lock pin 76c is brought into contact with the step plate portion 74f.

Figure 18A:
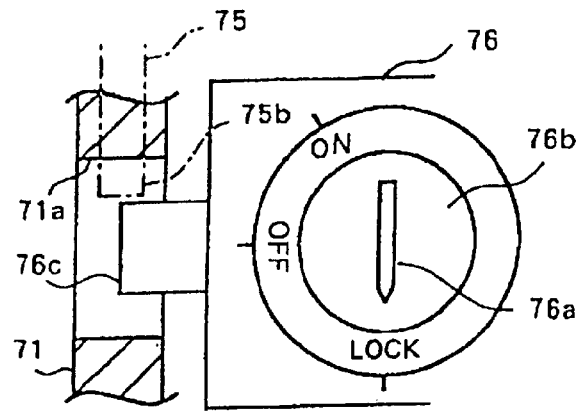
FIGS. 18(a) to 18(c) are views illustrating the operations of the second embodiment of the present invention.
Figure 18B:
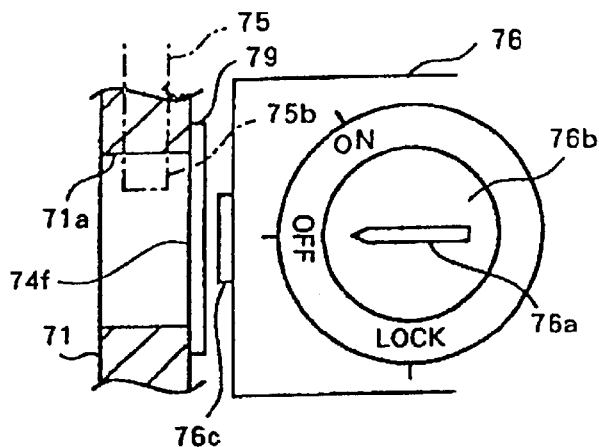
Figure 18C:
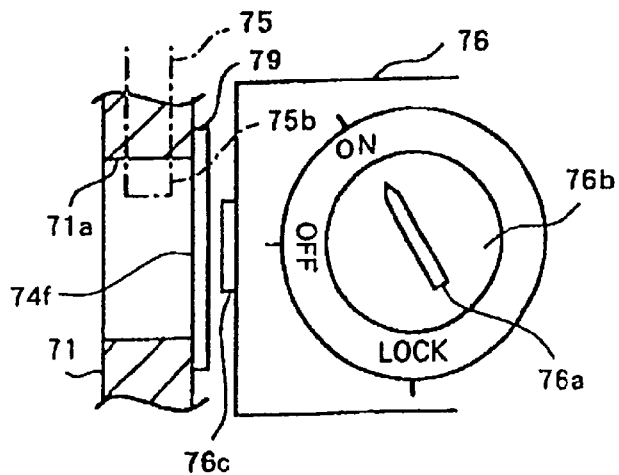

When the parking lever 71 is pulled up, the claw 74c of the pole lever 74 is moved from the recess 73b onto the ratchet 73a and then further moved up while sliding on the ratchet 73a, with a result that the pole lever 74 is turned clockwise as seen in FIGS. 16 and 17 around the pin 74b which is the supporting center of the pole lever 74. The stop plate portion 74f of the pole lever 74 is thus moved from the position (see FIG. 16) at which the stop plate portion 74f is overlapped to the cutout 71a to the position (see FIG. 17) at which the stop plate portion 74f is removed from the cutout 71a. In this way, since the cutout 71a is opened, the key cylinder 76b located at the ON or OFF position can be turned into the LOCK position as shown in FIG. 18(a).

The pole lever 74 and thereby the parking lever 71 can be held by engagement of the claw 74c of the pole lever 74 with an initial low crest or tooth of the ratchet 73a. However, in this embodiment, the parking lever 71 can be held in the state in which the claw 74c is more certainly engaged with the ratchet 73a as follows: namely, when the claw 74c of the pole lever 74 is engaged with the initial crest, part of the stop plate portion 74f is in the state being overlapped to the cutout 71a, and in such a state, the key cylinder 76b cannot be turned into the LOCK position. In addition, when the claw 74c is slid on the second and later crests of the ratchets 73a, the stop plate portion 74f is shifted from the cutout 71a to open the cutout 71a, whereby the key cylinder 76b can be turned into the LOCK position. Of course, the shapes and dimensions of the stop plate portion 74f of the pole lever 74 and the like are determined so as to allow the above-described operation.

Even in this embodiment, in the parking brake operational state in which the parking lever 71 is pulled up (see FIG. 17), since the lock pin 76c projects in the cutout 71a, if an operational button 75a is intended to be depressed for depressing a rod 75, the movement of the rod 75 is blocked by contact of a leading end 75b of the rod 75 with the lock pin 76c, to thereby block the operation to press the stop plate portion 74f of the pole lever 74 by the leading end 75b of the rod 75 to turn the stop plate portion 74f clockwise in FIG. 17, thereby removing the claw 74c from the ratchet 73a. That is to say, in this state, the operation to release the parking brake by depressing the parking lever 71 is blocked.

When in the parking brake operational state, an ignition key 77 is inserted in a key hole 76a of the key cylinder 76b to turn the key cylinder 76b to the ON or OFF position, the lock pin 76c retracts in an ignition block 76, so that the operational button 75a can be depressed to move the rod 75. As a result, the pole lever 74 can be turned to release the engagement between the claw 74c and the ratchet 73a, to depress the parking lever 71, thereby releasing the parking brake.

While the embodiments have been described by example of the four-wheeled vehicle on which only a driver is allowed to ride and which is driven by an internal combustion engine, the present invention may be variously applied, for example, to four-wheeled vehicles of the type in which an electric motor or a combination of an electric motor and an internal combustion engine is used as the power supply, a vehicle where a plurality of passengers are allowed to ride, a suspension of a different type from that described in the above-described embodiments is used, to a body cover that is formed by metal working, and to a three-wheeled vehicle. Further, the above-described embodiment has been configured such that when the key cylinder is located in the lock position in the parking brake operational state, the leading end of the rod is brought into contact with the lock pin to block the movement of the rod. However, there may be adopted a configuration where the lock pin is engaged or fitted to a portion (typically, a mid portion) other than the leading end, of the rod to block the movement of the rod.

As described above, according to the present invention, an ignition device is additionally provided on a parking lever in such a manner that an ignition key can be removably inserted in a key cylinder of the ignition device only when the parking lever is in a brake lock state. Accordingly, if the ignition key is removed by a driver when the vehicle is parked and the driver is separated from the vehicle, the wheels are already in the lock state by the parking brake, and if a power supply such as an internal combustion engine of a vehicle in the parking state is started, the wheels are already in the lock state by the parking brake.

When the parking lever is pulled up into a parking brake operational state and the key cylinder is turned into the lock position, the parking lever is blocked from being depressed, with a result that the parking brake can be prevented from being accidentally released during parking.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking brake device for a vehicle comprising:
    a base member;
    a parking lever movably supported on said base member;
    a brake actuating member for transmitting a force of said parking lever, thereby locking a brake;
    an ignition device operatively connected to said parking lever, said ignition device being movable to a first position where a key is removably insertable in a key cylinder, and to a second position for permitting actuation of a power supply of the vehicle, said first and second positions being set as shift positions of said key cylinder; and
    a lock piece operatively connected to said ignition device, said lock piece projecting when said key cylinder is located in said first position and retracting when said key cylinder is turned to said second position, and said parking lever being provided with an engagement portion to be engaged with said lock piece in the projecting state, thereby fixing said parking lever, whereby said key is removably insertable in said key cylinder only in a state in which said parking brake device is operated,
    wherein said base member is provided with a ratchet, and
    wherein said parking lever is provided with a turnable pole lever having a claw to be engaged with said ratchet, a biasing member for providing a biasing force for engaging said claw with said ratchet, and a rod for deactuating the biasing force applied to said claw and said pole lever, said pole lever being turned against the biasing force for removing said claw from said ratchet by depressing said rod,
    whereby when said parking lever is actuated and said key cylinder is located at said second position, said rod is brought into contact with said lock piece to be prevented from being depressed.

2. The parking brake device for a vehicle according to claim 1, wherein said parking lever is provided with a cutout in which said lock piece in the projecting state is to be inserted; and a link mechanism having a stop plate for opening/closing said cutout according to the movement of said parking lever is interposed between said parking lever and said base member, said stop plate being operated to open said cutout for allowing the projection of said lock piece in a state in which said parking lever is actuated and to block said cutout for blocking the projection of said lock piece in a state in which said parking lever is depressed.

3. The parking brake device for a vehicle according to claim 2, wherein said link mechanism is bent and said stop plate being overlapped with the cutout for blocking the cutout when said parking lever is depressed and for opening the cutout when said parking lever is actuated.

4. The parking brake device for a vehicle according to claim 2, wherein said link mechanism includes a link and a triangular stop plate, said link being attached at one end to said ratchet and a distal end attached to said triangular stop plate for imparting movement to said triangular stop plate for selectively opening/closing the cutout.

5. The parking brake device for a vehicle according to claim 1, wherein said brake actuating member for transmitting a force of said parking lever thereby locking a brake includes a brake wire.

6. The parking brake device for a vehicle according to claim 1, wherein said rod includes a first end for manual actuation and a distal end, said distal end being in engagement with a recess in said pole lever of selectively actuating said pole lever for disengagement of said claw from said ratchet.

7. The parking brake device for a vehicle according to claim 6, wherein said distal end of said rod is bent into a hook-shape for engagement with said recess in said pole lever.

8. The parking brake device for a vehicle according to claim 1, further including a starter switch provided on an inner panel of the vehicle for actuating a motor only after the key in said ignition device is moved to said second position.

9. The parking brake device for a vehicle according to claim 1, wherein said pole lever being provided with a stop plate portion, said stop plate portion being operated to open said cutout for allowing the projection of said lock piece in a state in which said parking lever is actuated and to block said cutout for blocking the projection of said lock piece in a state in which said parking lever is deactuated.

10. A parking brake device for a vehicle comprising:
    a base member;
    a parking lever movably supported on said base member;
    a brake actuating member for transmitting a force of said parking lever, thereby locking a brake;
    a locking device operatively connected to said parking lever, said locking device being movable to a first position adapted to permit a key to be removed and inserted into a key cylinder, and to a second position for permitting actuation of a power supply of said vehicle; and
    a lock piece operatively connected to said locking device, said lock piece projecting when said key cylinder is located in said first position and retracting when said key cylinder is turned to said second position, and said parking lever being provided with an engagement portion to be engaged with said lock piece in the projecting state, thereby fixing said parking lever,
    whereby said key is removably insertable in said key cylinder only in a state in which said parking brake device is operated,
    wherein said base member is provided with a ratchet, and
    wherein said parking lever is provided with a turnable pole lever having a claw to be engaged with said ratchet, a biasing member for providing a biasing force for engaging said claw with said ratchet, and a rod for deactuating the biasing force applied to said claw and said pole lever, said pole lever being turned against the biasing force for removing said claw from said ratchet by depressing said rod,
    whereby when said parking lever is actuated and said key cylinder is located at said second position, said rod is brought into contact with said lock piece to be prevented from being depressed.

11. The parking brake device for a vehicle according to claim 10, wherein said parking lever is provided with a cutout in which said lock piece in the projecting state is to be inserted; and a link mechanism having a stop plate for opening/closing said cutout according to the movement of said parking lever is interposed between said parking lever and said base member, said stop plate being operated to open said cutout for allowing the projection of said lock piece in a state in which said parking lever is actuated and to block said cutout for blocking the projection of said lock piece in a state in which said parking lever is depressed.

12. The parking brake device for a vehicle according to claim 11, wherein said link mechanism is bent and said stop plate being overlapped with the cutout for blocking the cutout when said parking lever is depressed and for opening the cutout when said parking lever is actuated.

13. The parking brake device for a vehicle according to claim 11, wherein said link mechanism includes a link and a triangular stop plate, said link being attached at one end to said ratchet and a distal end attached to said triangular stop plate for imparting movement to said triangular stop plate for selectively opening/closing the cutout.

14. The parking brake device for a vehicle according to claim 10, wherein said pole lever being provided with a stop plate portion, said stop plate portion being operated to open said cutout for allowing the projection of said lock piece in a state in which said parking lever is actuated and to block said cutout for blocking the projection of said lock piece in a state in which said parking lever is deactuated.

15. The parking brake device for a vehicle according to claim 10, wherein said brake actuating member for transmitting a force of said parking lever thereby locking a brake includes a brake wire.

16. The parking brake device for a vehicle according to claim 10, wherein said rod includes a first end for manual actuation and a distal end, said distal end being in engagement with a recess in said pole lever of selectively actuating said pole lever for disengagement of said claw from said ratchet.

17. The parking brake device for a vehicle according to claim 16, wherein said distal end of said rod is bent into a hook-shape for engagement with said recess in said pole lever.

18. The parking brake device for a vehicle according to claim 10, further including a starter switch provided on an inner panel of the vehicle for actuating a motor only after the key in said locking device is moved to said second position.

\* \* \* \* \*